US006315460B1

United States Patent
Nieman et al.

(10) Patent No.: US 6,315,460 B1
(45) Date of Patent: Nov. 13, 2001

(54) ORBITAL MOTION BEARING

(75) Inventors: Thomas J. Nieman, Livonia; Vinh Hiep Luong, Westland; Julian R. Soell, Ann Arbor, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/474,437

(22) Filed: Dec. 29, 1999

(51) Int. Cl.$^7$ .............................. F16C 33/58; F16C 19/10
(52) U.S. Cl. .................... 384/615; 384/609; 464/103; 418/55.3
(58) Field of Search ........................ 384/618, 609, 384/615; 418/55.3; 464/103

(56) References Cited

U.S. PATENT DOCUMENTS

| | | |
|---|---|---|
| 4,259,043 | 3/1981 | Hidden et al. . |
| 4,474,543 | 10/1984 | Hiraga et al. . |
| 4,565,457 | 1/1986 | Flander . |
| 4,645,435 | 2/1987 | Sugimoto . |
| 4,715,733 | 12/1987 | Rood . |
| 5,102,315 * | 4/1992 | Terauchi et al. ................ 418/55.3 |
| 5,470,283 | 11/1995 | Seidou . |
| 5,758,978 | 6/1998 | Satoda et al. . |
| 5,915,933 * | 6/1999 | Iizuka et al. ................ 418/55.3 |
| 5,921,684 * | 7/1999 | Niina ........................ 384/492 |
| 6,095,778 * | 8/2000 | Galante ...................... 418/55.3 |
| 6,139,293 * | 10/2000 | Iizuka et al. ................ 418/55.3 |
| 6,149,412 * | 11/2000 | Kikuchi ...................... 418/55.3 |
| 6,158,991 * | 12/2000 | Ohtake et al. ................ 418/55.3 |

FOREIGN PATENT DOCUMENTS

| | | |
|---|---|---|
| 59-39988 (A) | 3/1984 | (JP) . |
| 63-179185(A) | 7/1988 | (JP) . |
| 5-33811 A | 2/1993 | (JP) . |
| 5-126140 A | 5/1993 | (JP) . |
| 8-296656 * | 11/1996 | (JP) . |
| 09273545 A | 10/1997 | (JP) . |
| 09324816 A | 12/1997 | (JP) . |

* cited by examiner

Primary Examiner—Richard M. Lorence
(74) Attorney, Agent, or Firm—Larry I. Shelton

(57) ABSTRACT

A scroll compressor (10) includes a housing (11) with a stationary scroll member (13) mounted therein and a swivel scroll member (12) positioned in the housing and cooperating with the stationary scroll member to form a compression chamber (16). A thrust bearing has a first bearing ring (40) for attachment to the housing (11) and having a plurality of circular bearing races (42,54), a second bearing ring (45) for attachment to the swivel scroll member (12) and having a plurality of circular bearing races (47,55), and a plurality of balls (56) retained between the rings in associated pairs of the races. The races can have rounded tip (50,51), pointed tip (57,59,60,61,62), plateau (52,53) or flat center (54,55) portions. The first bearing ring (40) can have a thickness (C) different than a thickness (D) of the second earing ring.

6 Claims, 4 Drawing Sheets

ORBITAL MOTION BEARING

BACKGROUND OF THE INVENTION

The present invention relates to a thrust ball bearing positioned between two members carrying out eccentric rotating movements relative to one another, such as a swivel scroll member and a stationary scroll member in a vehicle air conditioning scroll compressor.

In the FIGS. 1–3, there is shown a known scroll compressor 10 including a housing 11 in which are positioned a swivel scroll member 12 and a stationary scroll member 13. The stationary scroll member 13 is fixed to the housing 11 and the swivel scroll member is free to rotate inside the housing 11. The swivel scroll member 12 is provided with spiral partitions 14 extending toward the stationary scroll member 13 and the stationary scroll member 13 is provided with spiral partitions 15 extending toward the swivel scroll member 12. The partitions 14 and cooperate to form a compression chamber 16 having a capacity that is varied in accordance with the eccentric rotations of the swivel scroll member 12 with respect to the stationary scroll member 13 thereby compressing a fluid in the compression chamber 16.

A central axis 17 of the swivel scroll member 12 is aligned with a longitudinal axis of an eccentric end 18 of a drive shaft 19 rotated by a drive motor 20. The drive shaft 19 has a main longitudinal axis 21 that is offset from the central axis 17 by a distance "A" such that as the drive motor 20 rotates the drive shaft 19, the swivel scroll member 12 eccentrically rotates at a swivel radius equivalent to the eccentricity amount "A". During operation, a thrust load is imposed in an axial direction upon the rotating swivel scroll member 12 by compression cycles of the fluid in the compression chamber 16. In order to support the thrust load, a thrust ball bearing 22 is disposed between the swivel scroll member 12 and the housing 11.

The bearing 22 includes a pair of bearing rings 23 having the same shape and same dimension and a plurality of balls 24 disposed between the bearing rings. As shown in the FIG. 2, the bearing rings 23 each have a generally planar annular body 25 with a plurality of annular bearing races 26 open to one planar surface 27. The races 26 are formed as depressions or grooves in the surface 27. As shown in the FIG. 1, one of the rings 23 is mounted in an annular recess 28 formed in a surface of the housing 11 facing the swivel scroll member 12 and the other ring 23 is mounted in a similar recess 29 formed in a surface of the swivel scroll member 12 facing the housing 11.

The balls 24 are retained in the facing races 26 as shown in the FIGS. 1 and 3. The balls 24 in the respective races 26 roll on a pitch circle 30 corresponding to the eccentric rotations of the swivel scroll member 12. The pitch circle 30 is the lowest portion of the race wall which is curved at a predetermined radius. A diameter "B" of the pitch circle 30 is equal to the eccentricity distance "A".

In the conventional thrust ball bearing 22, the bearing rings 23 are of the same shape and same dimensions, and the groove curvatures of the races 26 are the same. The curvatures of the races 26 have a larger radius than a radius of the balls 24 to decrease the contact pressures with the balls to increase the service life thereof. The use of identical rings 23 decreases manufacturing, assembly and replacement parts costs.

However, manufacturing tolerances may cause the races 26 to be misaligned upon assembly of the bearing 22. One known solution to this problem is to make the radius of curvature of one of the races 26 larger than the radius of curvature of the facing race to accommodate axial misalignment. If the smaller and larger diameter races are alternated, a pair of identical rings can be utilized in the thrust bearing assembly.

It is also known to make the rings 23 of different thickness.

SUMMARY OF THE INVENTION

The present invention concerns a thrust bearing for a scroll compressor having a housing with a stationary scroll member mounted therein and a swivel scroll member positioned in the housing and cooperating with the stationary scroll member to form a compression chamber. The thrust bearing includes a first stationary bearing ring for attachment to the housing and having a plurality of circular bearing races, a second swivel bearing ring for attachment to the swivel scroll member and having a plurality of circular bearing races, and a plurality of balls retained between the rings in associated pairs of the races. The circular races each have a center portion that can be a rounded tip, a pointed tip, a plateau or a flat shape. The first stationary bearing ring can have a thickness different than a thickness of the second swivel bearing ring, for example, the first ring is thinner than the second ring.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 4:
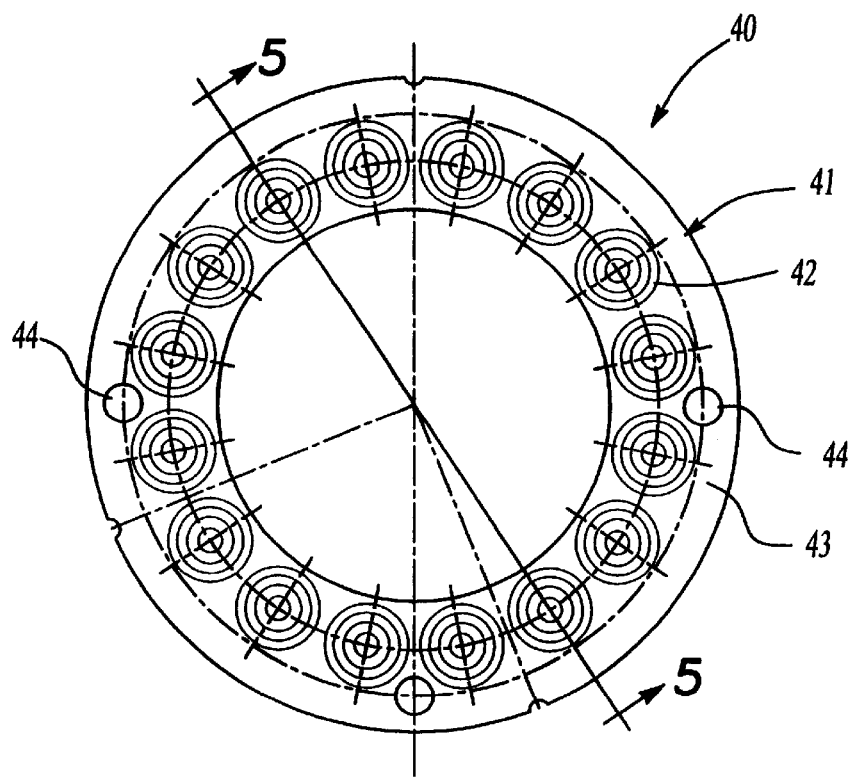
FIG. 4 is a top plan view of a stationary bearing ring according to the present invention for the stationary scroll member of a scroll compressor.
Figure 5:
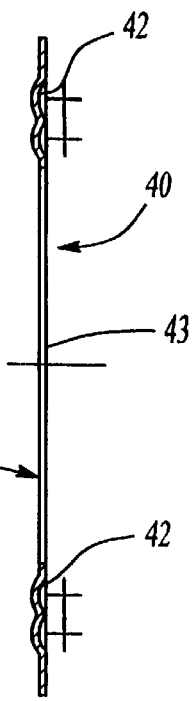
FIG. 5 is a cross-sectional view of the stationary bearing ring taken along the line 5—5 in the FIG. 4.

The present invention concerns a thrust ball bearing for a scroll compressor. There is shown in the FIGS. 4–5 a stationary bearing ring 40 according to the present invention that can be, for example, mounted on the stationary scroll member 13 shown in the FIG. 1 in place of the bearing ring 23.

The bearing ring 40 has a generally planar annular body 41 with a plurality of generally annular bearing races 42 formed in one planar surface 43. The bearing races 42 are of uniform shape and dimensions and are equally spaced in a circle. A pair of opposed mounting apertures 44 are formed in the body 41 between the races 42 and an outer periphery of the body. Pins (not shown) cooperate with the apertures 44 to secure the bearing ring 40 on a stationary scroll member such as the member 13 shown in the FIG. 1.

Figure 1:
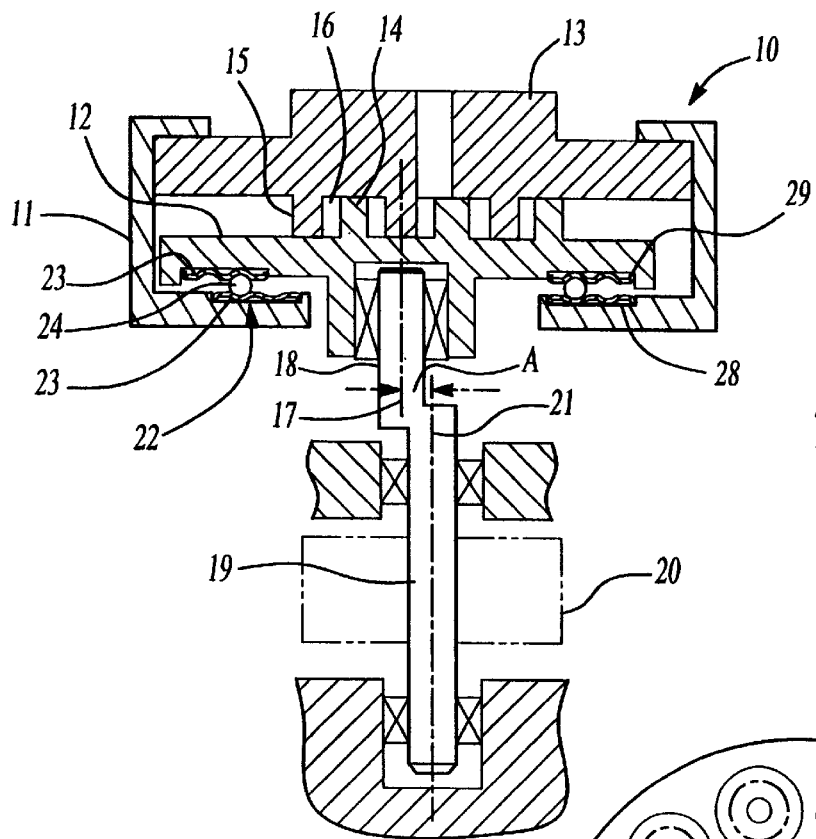
FIG. 1 is a cross-sectional view showing the thrust ball bearing in a prior art scroll compressor.
Figure 2:
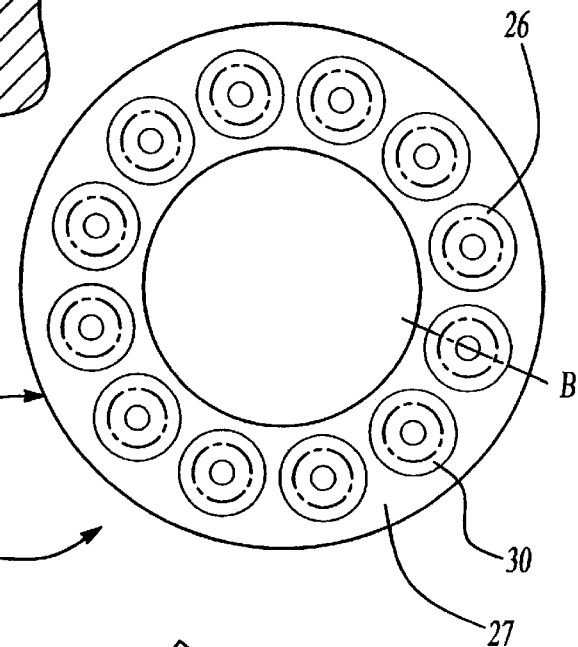
FIG. 2 is a plan view showing the bearing ring of the prior art scroll compressor shown in the FIG. 1.
Figure 6:
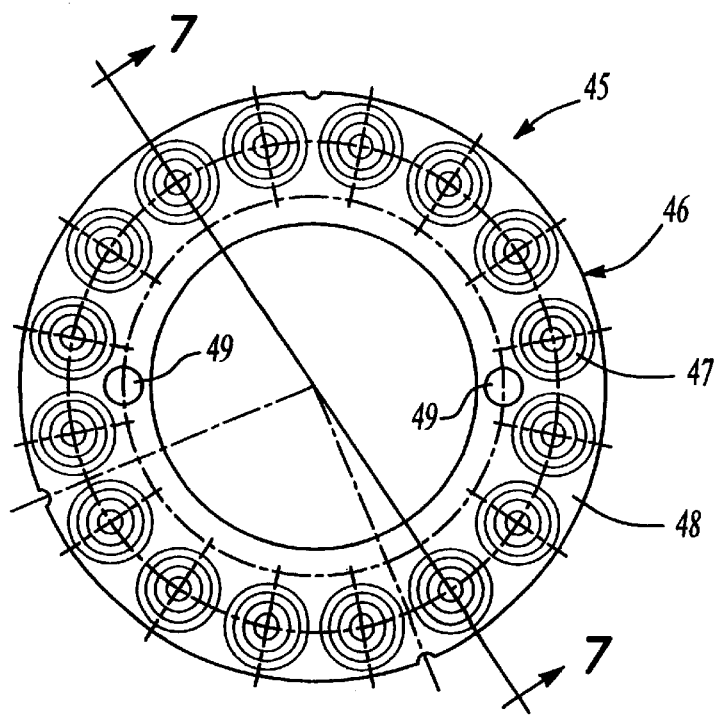
FIG. 6 is a top plan view of a swivel bearing ring according to the present invention for the swivel scroll member of a scroll compressor.
Figure 7:
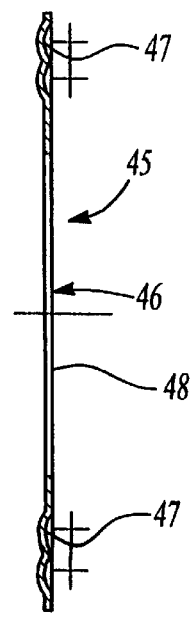
FIG. 7 is a cross-sectional view of the swivel bearing ring taken along the line 7—7 in the FIG. 6.

There is shown in the FIGS. 6–7 a swivel bearing ring 45 according to the present invention that can be, for example, mounted on the swivel scroll member 12 shown in the FIG. 1 in place of the bearing ring 23. The bearing ring 45 has a generally planar annular body 46 with a plurality of generally annular bearing races 47 formed in one planar surface 48. The bearing races 47 are of uniform shape and dimensions and are equally spaced in a circle. A pair of opposed mounting apertures 49 are formed in the body 46 between the races 47 and an inner periphery of the body. Pins (not shown) cooperate with the apertures 49 to secure the bearing ring 45 on a swivel scroll member such as the member 12 shown in the FIG. 1.

Figure 3:
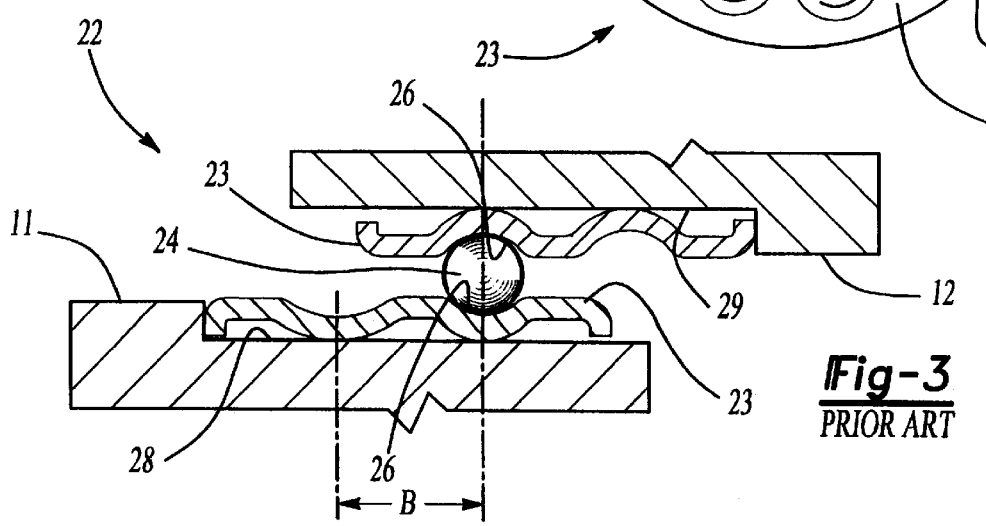
FIG. 3 is an enlarged cross-sectional view showing a portion of the prior art thrust ball bearing shown in the FIG. 1.
Figure 8:
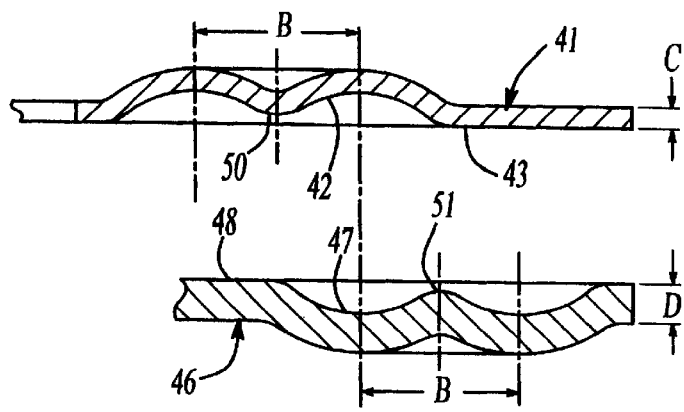
FIG. 8 is enlarged fragmentary cross-sectional view of the races of the rings shown in the FIGS. 4–7 positioned to cooperate with a ball.

Portions of the rings 40 and 45 including the races 42 and 47 respectively are shown in more detail in the FIG. 8 that is a view similar to the FIG. 3. The races 42 and 47 are substantially identical in shape and dimensions for receiving a ball (not shown) such as the ball 24 shown in the FIG. 3. The rings 40 and 45 can be formed of any suitable material and can be formed of different materials. The races 42 and 47 are each formed with a predetermined radius of curvature defining a race wall. The diameter "B" of the track of the race 42, the distance between opposed low points, is such that a rounded tip center 50 is formed at the center of the track slightly below the surface 43. The race 47 is formed with a similar rounded tip center 51. However, the body 41 has a different thickness than the body 46. The body 41 has a relatively uniform thickness "C" and the body 46 has a relatively uniform thickness "D" with the thickness "D" being substantially larger than the thickness "C".

Figure 9:
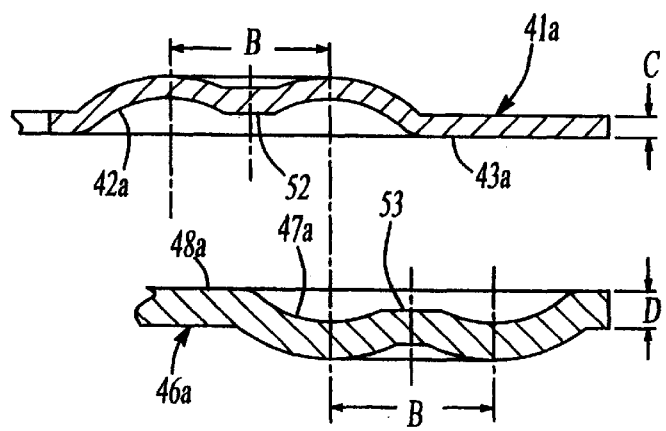
FIG. 9 is an enlarged fragmentary cross-sectional view similar to the FIG. 8 showing an alternate embodiment of the present invention.

There is shown in the FIG. 9 a first alternate embodiment of the present invention wherein similar parts are identified with the reference numerals used in the FIG. 8 and a suffix "a". The races 42a and 47a are substantially identical in shape and dimensions for receiving a ball (not shown) such as the ball 24 shown in the FIG. 3. The body 41a has a relatively uniform thickness "C" and the body 46a has a relatively uniform thickness "D" with the thickness "D" being substantially larger than the thickness "C". Furthermore, the race 42a is formed with a flat or plateau center 52 and the race 47a is formed with a similar upstanding plateau center 53.

Figure 10:
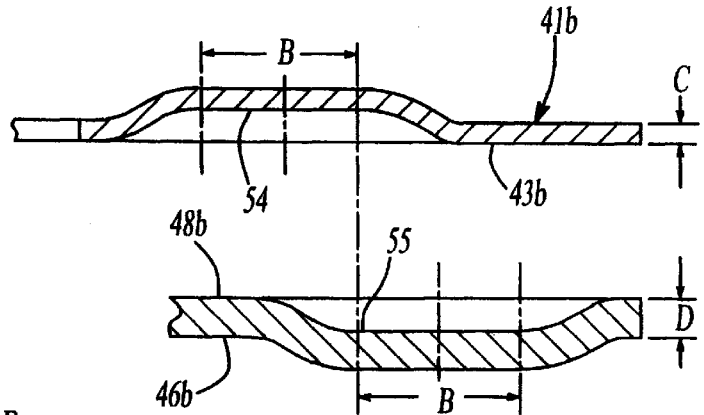
FIG. 10 is an enlarged fragmentary cross-sectional view similar to the FIG. 8 showing a second alternate embodiment of the present invention.

There is shown in the FIG. 10 a second alternate embodiment of the present invention wherein similar parts are identified with the reference numerals used in the FIG. 8 and a suffix "b". A race 54 formed in the body 41b and a race 55 formed in the body 46b are substantially identical in shape and dimensions for receiving a ball (not shown) such as the ball 24 shown in the FIG. 3. The races 54 and 55 are formed as circular depressions without an upstanding portion so that there is a flat center of the diameter "B". The body 41b has a relatively uniform thickness "C" and the body 46b has a relatively uniform thickness "D" with the thickness "D" being substantially larger than the thickness "C".

Figure 11:
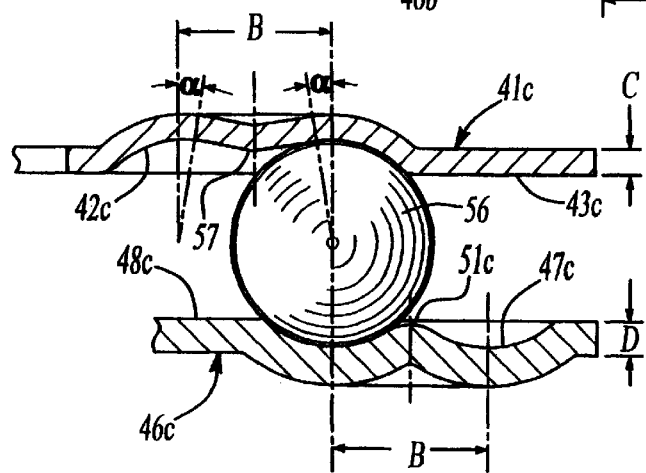
FIG. 11 is an enlarged fragmentary cross-sectional view similar to the FIG. 8 showing a third alternate embodiment of the present invention.

There is shown in the FIG. 11 a third alternate embodiment of the present invention wherein similar parts are identified with the reference numerals used in the FIG. 8 and a suffix "c". The race 47c is substantially identical in shape to the race 47 shown in the FIG. 8 for receiving a ball 56 such as the ball 24 shown in the FIG. 3. The body 41c has a relatively uniform thickness "C" and the body 46c has a relatively uniform thickness "D" with the thickness "D" being substantially larger than the thickness "C". The race 42c is formed with a pointed tip 57 at the center thereof. The pointed tip center 57 is formed by extending the wall of the race 42c inwardly tangent from a point at an angle "α" from the lowest point of the track.

Figure 12:
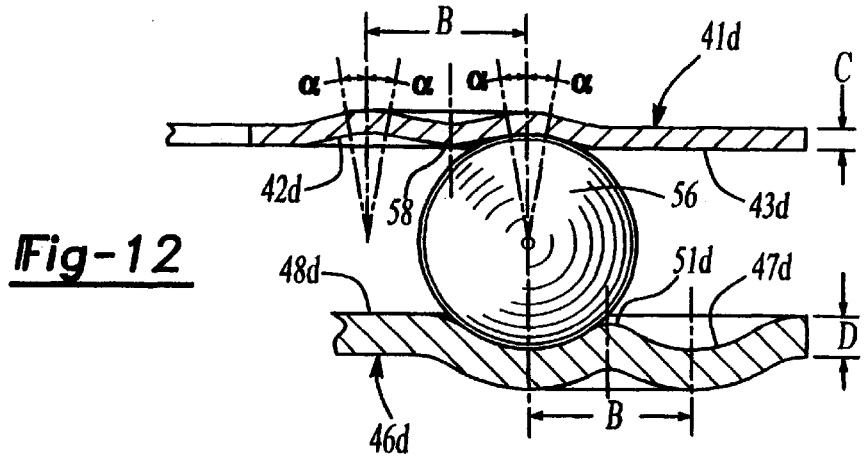
FIG. 12 is an enlarged fragmentary cross-sectional view similar to the FIG. 8 showing a fourth alternate embodiment of the present invention.

There is shown in the FIG. 12 a fourth alternate embodiment of the present invention wherein similar parts are identified with the reference numerals used in the FIG. 8 and a suffix "d". The race 47d is substantially identical in shape to the race 47 shown in the FIG. 8 for receiving the ball 56. The body 41d has a relatively uniform thickness "C" and the body 46d has a relatively uniform thickness "D" with the thickness "D" being substantially larger than the thickness "C". The race 42d is formed with a pointed tip 58 at the center thereof. The pointed tip center 58 is formed by extending the wall of the race 42d inwardly tangent from a point at an angle "α" from the lowest point of the track. Similarly, the wall of the race 42d is extended outwardly tangent from a point at an angle "α" from the lowest point of the track.

Figure 13:
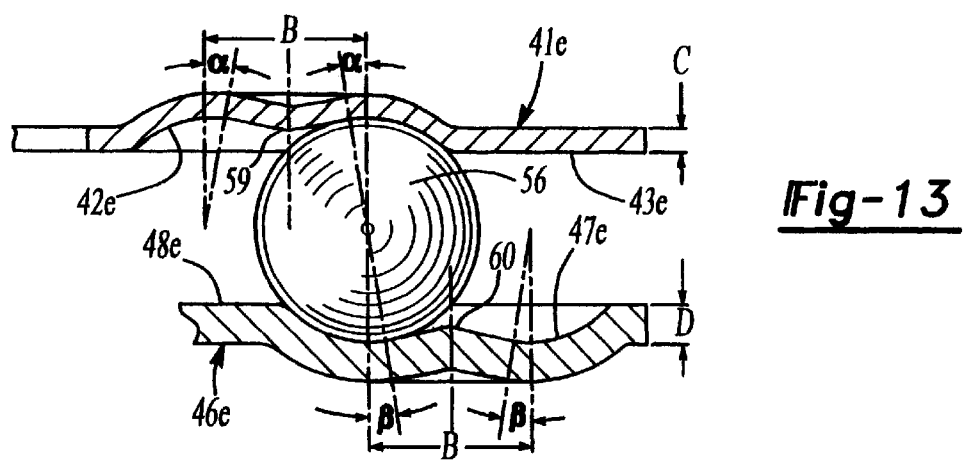
FIG. 13 is an enlarged fragmentary cross-sectional view similar to the FIG. 8 showing a fifth alternate embodiment of the present invention.

There is shown in the FIG. 13 a fifth alternate embodiment of the present invention wherein similar parts are identified with the reference numerals used in the FIG. 8 and a suffix "e". The body 41e has a relatively uniform thickness "C" and the body 46e has a relatively uniform thickness "D" with the thickness "D" being substantially larger than the thickness "C". The race 42c is formed with a pointed tip 59 at the center thereof. The pointed tip center 59 is formed by extending the wall of the race 42e inwardly tangent from a point at an angle "α" from the lowest point of the track. The race 42e is substantially identical in shape to the race 42c shown in the FIG. 11 for receiving the ball 56. The race 47e is formed with a pointed tip 60 at the center thereof. The pointed tip 60 is formed by extending the wall of the race 47e inwardly tangent from a point at an angle "β" from the lowest point of the track. The angles "α" and "β" can be the same or different.

Figure 14:
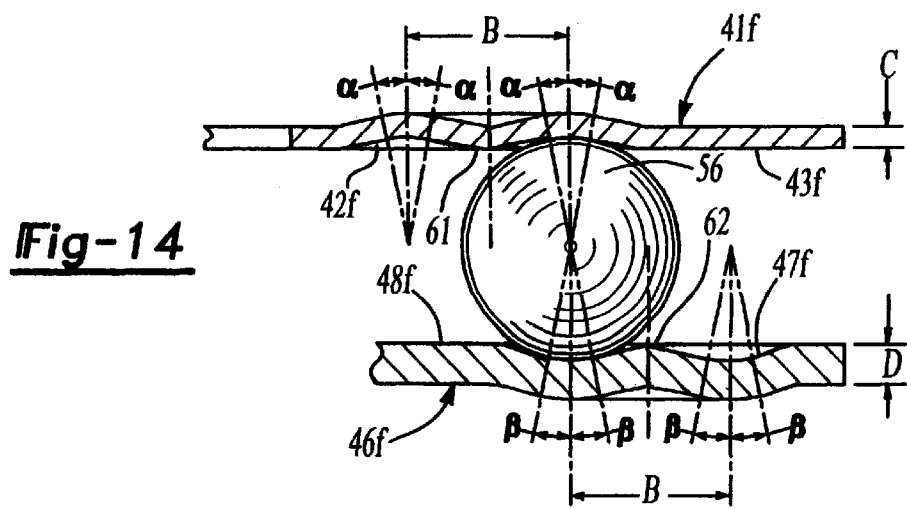
FIG. 14 is an enlarged fragmentary cross-sectional view similar to the FIG. 8 showing a sixth alternate embodiment of the present invention.

There is shown in the FIG. 14 a sixth alternate embodiment of the present invention wherein similar parts are identified with the reference numerals used in the FIG. 8 and a suffix "f". The race 42f is substantially identical in shape to the race 42d shown in the FIG. 12 with a pointed tip 61 in the center thereof. The body 41f has a relatively uniform thickness "C" and the body 46f has a relatively uniform thickness "D" with the thickness "D" being substantially larger than the thickness "C". The race 47f is formed with a pointed tip 62 at the center thereof. The pointed tip center 62 is formed by extending the wall of the race 47f inwardly tangent from a point at an angle "β" from the lowest point of the track. Similarly, the wall of the race 47f is extended outwardly tangent from a point at an angle "β" from the lowest point of the track.

The various race configurations shown in the FIGS. 8–14 can be mixed and matched as desired. Further, the body 41 of the stationary bearing ring 40 could be formed thicker than or the same thickness as the body 46 of the swivel bearing ring 45.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A thrust bearing for a scroll compressor having a housing, a stationary scroll member mounted in the housing and a swivel scroll member positioned in the housing and cooperating with the stationary scroll member to form a compression chamber, the thrust bearing comprising:

a generally planar first bearing ring for attachment to a scroll compressor housing and having a plurality of generally circular curved wall bearing races formed therein, wherein at least one of the plurality of races of said first bearing ring is formed by extending a wall of an associated one of the plurality of races of said first bearing ring inwardly tangent to a curvature of the wall from a point at an angle "α" from a lowest point of the associated one of the plurality of races of said first bearing ring;

a generally planar second bearing ring for attachment to a swivel scroll member positioned in the housing and having a plurality of generally circular curved wall races formed therein; and a plurality of balls retained between said rings, each of said balls cooperating with one of said first bearing ring races and an associated one of said second bearing ring races.

2. The thrust bearing according to claim 1 wherein the wall also is extended tangent to the curvature of the wall from a point at an angle "α" outwardly from the lowest point of the associated race.

3. The thrust bearing according to claim 1 wherein at least one of the plurality of races of said second bearing ring is formed by extending a wall of an associated one of the plurality of races of said second bearing ring inwardly tangent to a curvature of the wall from a point at an angle "β" from a lowest point of the associated one of the plurality of races of said second bearing ring.

4. The thrust bearing according to claim 3 wherein said angles "α" and "β" are equal.

5. The thrust bearing according to claim 3 wherein said angles "α" and "β" are different.

6. The thrust bearing according to claim 1 wherein said first bearing ring and said second bearing ring have different thicknesses.

* * * * *